(12) United States Patent
Sutton et al.

(10) Patent No.: US 11,994,210 B2
(45) Date of Patent: May 28, 2024

(54) METHOD AND SYSTEM FOR CONTROLLING THE ACCELERATION OF A VEHICLE

(71) Applicant: J. C. Bamford Excavators Limited, Uttoxeter (GB)

(72) Inventors: Thomas George Sutton, Uttoxeter (GB); Lawrence Lyndon Helmick, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 18/217,384

(22) Filed: Jun. 30, 2023

(65) Prior Publication Data
US 2024/0035565 A1 Feb. 1, 2024

(30) Foreign Application Priority Data
Jun. 30, 2022 (GB) .................................. 2209660

(51) Int. Cl.
| | | |
|---|---|---|
| *F16H 61/46* | (2010.01) | |
| *F16H 61/468* | (2010.01) | |
| *F16H 61/472* | (2010.01) | |
| F16H 59/14 | (2006.01) | |
| F16H 59/48 | (2006.01) | |

(52) U.S. Cl.
CPC ......... *F16H 61/468* (2013.01); *F16H 61/472* (2013.01); *F16H 2059/147* (2013.01); *F16H 59/48* (2013.01)

(58) Field of Classification Search
CPC .. F16H 59/48; F16H 2059/147; F16H 61/468; F16H 61/472; B60W 10/06; B60W 10/10; B60W 10/101; B60W 30/1882
See application file for complete search history.

(56) References Cited

U.S. PATENT DOCUMENTS

| | | | | |
|---|---|---|---|---|
| 4,701,853 A | * | 10/1987 | Osanai | F16H 61/66 474/11 |
| 8,992,381 B1 | * | 3/2015 | Oda | B60W 10/06 477/115 |
| 9,764,740 B1 | * | 9/2017 | Lister | B60W 30/188 |
| 9,855,951 B1 | * | 1/2018 | Lister | B60W 10/06 |
| 2007/0142163 A1 | | 6/2007 | Murray | |
| 2018/0245529 A1 | | 8/2018 | Matsumoto et al. | |
| 2019/0023260 A1 | * | 1/2019 | Dona | F02D 31/001 |
| 2020/0231139 A1 | | 7/2020 | Yamamoto et al. | |

FOREIGN PATENT DOCUMENTS

WO WO-2014/139960 A1 9/2014

OTHER PUBLICATIONS

Search Report issued in GB2209660.6, dated Dec. 21, 2022.
Extended European Search Report issued in EP 23182152.1, dated Dec. 1, 2023.

* cited by examiner

*Primary Examiner* — Edwin A Young
(74) *Attorney, Agent, or Firm* — MARSHALL, GERSTEIN & BORUN LLP

(57) ABSTRACT

A method for controlling the acceleration of a vehicle includes: receiving a demand for acceleration from an operator input device; applying an initial transmission ratio to provide a vehicle acceleration whilst maintaining a current engine speed; and applying a loading transmission ratio to increase the output from the engine, wherein the loading transmission ratio is determined using the vehicle acceleration.

20 Claims, 11 Drawing Sheets

METHOD AND SYSTEM FOR CONTROLLING THE ACCELERATION OF A VEHICLE

FIELD

The present invention relates to controlling acceleration of a vehicle. In particular, though not exclusively, the invention relates to a work machine comprising a continuous variable transmission.

BACKGROUND

A continuous variable transmission, CVT, powertrain provides the capability to change the transmission ratio continuously between 0% and 100%. This allows the engine to be operated at any desired engine speed with the gearing providing no constraint.

One current drawback to CVT powertrains is the response to significant changes in acceleration demand. Conventionally, upon receiving an acceleration demand, a CVT powertrain control system will force the engine speed to peak power prior to changing the transmission ratio to provide an acceleration.

There are two main problems with this approach. Firstly, there is an inherent delay between a request for acceleration and the vehicle being accelerated. This can lead to a harsh and unpredictable response from the control system. Secondly, the use of peak power, regardless of the power requirement for achieving the desired acceleration, has an efficiency limitation. Peak power is invariably not the most energy efficient region to operate the engine at.

The present disclosure seeks to provide an improved method of controlling acceleration in a vehicle.

SUMMARY

The present invention provides a method and apparatus for controlling the acceleration of a vehicle according to the appended claims.

The present disclosure provides a method for controlling the acceleration of a vehicle, comprising: receiving a demand for acceleration from an operator input device and applying an initial transmission ratio to provide a vehicle acceleration. The initial transmission ratio may be applied whilst maintaining a current engine speed. The method may further comprise: applying a loading transmission ratio to increase the load on the engine, wherein the loading transmission ratio is determined using the vehicle acceleration.

Providing an initial transmission ratio and resultant acceleration provides an instant response for the operator upon demanding the acceleration. Further, using the vehicle acceleration to determine the subsequent transmission ratio, that is, the loading transmission ratio, it is possible to maintain an acceleration as the output from the engine is increased.

The increase in output may be an increase in load and/or power. For example, where the engine reaches a full load operating point, that is, on or near the full load curve, following the initial transmission ratio, the loading transmission ratio may be reduced to allow for an increase in engine speed. Where the engine is below a full load operating point, the load may be increased without an increase in engine speed. By careful selection of the transmission ratio, it is possible to maintain an acceleration whilst progressively increasing the load on the engine, or the power output of the engine.

The loading transmission ratio may increase the load on the engine towards a full load operating point. The loading transmission ratio may be applied until the engine is operating at a full load operating point. The loading transmission ratio may be provided prior to increasing the current engine speed. The engine may be operating at full load whilst the engine speed is increased.

The loading transmission ratio may be the same as the initial transmission ratio. Hence, where the initial transmission ratio is suitable for providing the acceleration, the initial transmission ratio may be continually applied until the required load necessitates a change in the transmission ratio.

The loading transmission ratio may be reduced when the engine is operating at the full load operating point to increase an engine speed towards peak power. The engine may be maintained at the full load operating point (i.e. on the full load curve) to provide the demanded acceleration. The engine speed may be increased until peak power is reached.

The loading transmission ratio may be adjusted as an engine load and vehicle acceleration varies over time.

The loading transmission ratio may be selected using acceleration demand and vehicle speed. The loading transmission may be determined in dependence of the engine load.

The loading transmission ratio may be selected from one of a plurality of look-up tables. The look-up tables may provide a plurality of values for the transmission ratio or transmission ratio gradient. The look-up tables may provide values of transmission ratio or transmission ratio gradient for values of acceleration demand and vehicle speed. Each look-up table in the plurality of look-up tables may be associated with an acceleration value or range of acceleration values. Each look-up table may be associated with a value of range of values of engine load. The engine load and acceleration values may be measured or determined from measured vehicle data.

The plurality of look-up tables may be arranged in a matrix. The matrix may be a 3×3 matrix. Each of the plurality of look-up tables in the matrix may be associated with an acceleration and an engine load. The matrix of look-up tables may comprise rows or columns associated with a given engine load, with the other of the rows and columns being associated with a given acceleration. Hence, the matrix of look-up tables may comprise a first row having a first load with each look-up table in that row being associated with a different acceleration. The matrix may have a first column having a first acceleration, with each row being associated with a different load.

Selecting the initial or loading transmission ratio may comprise interpolating between the values provided in the plurality of look-up tables. The method may comprise determining values from a plurality of look-up tables for vehicle speed and acceleration demand and interpolating between the values to obtain a transmission ratio or transmission ratio gradient. The method may comprise interpolating between adjacent look-up tables having different acceleration values. The method may comprise interpolating between adjacent look-up tables having different engine load values. The method may comprise interpolating to find values for vehicle speed; acceleration demand; vehicle speed; engine load and engine speed.

The loading transmission ratio may be selected on the basis of the acceleration demand, the vehicle speed, vehicle acceleration and the engine load.

The vehicle acceleration and engine load may comprise one of a low acceleration, a medium acceleration or a high acceleration in combination with one of a low load, a medium load and a high load. That is, each of the plurality of look-up tables may comprise one of a low acceleration, a medium acceleration or a high acceleration in combination with one of a low load, a medium load and a high load.

The low acceleration may comprise a value in range bounded by any two values taken from $-9$ ms$^{-2}$, $-5$ ms$^{-2}$, $-3$ ms$^{-2}$, $-1$ ms$^{-2}$, 0 ms$^{-2}$, 0.25 ms$^{-2}$ or 0.5 ms$^{-2}$. For example, the low acceleration may comprise a value in a range bounded by 0 ms$^{-2}$ and 0.25 ms$^{-2}$, or bounded by $-9$ ms$^{-2}$ and 0.25 ms$^{-2}$. The low acceleration value may be adjustable within a range of values. The low acceleration value may be adjustable in accordance with an engine speed error.

The medium acceleration may comprise a value in range bounded by any two values taken from 0 ms$^{-2}$, 0.25 ms$^{-2}$, 0.7 ms$^{-2}$, 0.8 ms$^{-2}$, 0.9 ms$^{-2}$, 1 ms$^{-2}$ or 1.25 ms$^{-2}$. For example, the medium acceleration may comprise a value in a range bounded by 0.25 ms$^{-2}$ and 0.8 ms$^{-2}$, or bounded by 0.5 ms$^{-2}$ and 0.7 ms$^{-2}$. The medium acceleration value may be adjustable. The medium acceleration value may be adjusted in accordance with an engine speed error.

The high acceleration may comprise a value in range bounded by any two values taken from 1 ms$^{-2}$, 1.25 ms$^{-2}$, 1.5 ms$^{-2}$, 1.75 ms$^{-2}$ and 2 ms$^{-2}$. For example, the high acceleration may comprise a value in a range bounded by 1 ms$^{-2}$ and 2 ms$^{-2}$, or bounded by 1 ms$^{-2}$ and 1.5 ms$^{-2}$. The high acceleration value may be adjustable. The high acceleration value may be adjusted in accordance with an engine speed error.

It will be appreciated that the terms 'low', 'medium' and 'high' are used relative to one another with the low acceleration value being the lowest of the acceleration value look-up tables, and the high acceleration the highest. There may be multiple medium acceleration look-up tables.

The engine speed error may be a difference between a desired engine speed and the actual engine speed. The desired engine speed may be determined from the operator acceleration input device position and the vehicle speed. Thus, the values of low, medium and high acceleration value may be varied in accordance with a difference between a desired engine speed and an actual engine speed. Allowing the adjustment of the acceleration values associated with each look-up table allows the current engine speed and the desired or expected engine speed for an operator input to be accounted for, thereby improving the selection of the transmission ratio.

Low load may comprise a range of engine loads bounded by any two values taken from 15%, 20%, 25%, 30% and 40%, 50% and 60% of full load. Medium load may comprise a range of engine loads bounded by any two values taken from 50%, 60%, 70%, 80% and 90% of full load. High load may comprise a range of engine loads bounded by any two values taken from 80%, 90% and 100% of full load. The low load may comprise an engine load between 15% and 30% of full load, the medium load may comprise an engine load between 50% and 70% of full load, and the high load may comprise an engine load between 80% and 100% of full load.

The initial and loading transmission ratios may be transmission ratio gradients. The transmission ratio gradients may comprise a rate of change of transmission ratio. The rate of change may be a per second rate of change. The initial transmission ratio gradient may be between a 0.01 and a 0.1 per second. The transmission ratio may be defined as the output shaft speed/the input shaft speed. The transmission ratio maybe adjustable between 0 and 2.5.

The methods according to the present disclosure may comprise continual monitoring of one or more vehicle operating parameters so that the transmission ratio may be continually adjusted to maintain the acceleration following an acceleration demand. The vehicle operating parameters may include one or more from the group comprising: acceleration demand, vehicle acceleration, vehicle speed, engine load and engine speed. The loading transmission ratio may be continuously varied in accordance during an acceleration demand.

The present disclosure provides a method of controlling the acceleration of a vehicle, comprising: receiving a demand for acceleration from an operator input device; applying a transmission ratio to provide a vehicle acceleration, determining an acceleration of the vehicle caused by the transmission ratio and determining, using the acceleration response, whether the acceleration demand can be met at the current engine speed. The method may further comprise increasing the engine speed towards peak power if the acceleration demand cannot be met at the current engine speed.

The engine speed may be increased to peak power whilst maintaining the engine at the full load operating point. The full load operating point may comprise an engine load at or above 90% of the 100% load. The full load operating point may comprise an engine load at or above 95% of the 100% load The present disclosure provides a method for controlling the acceleration of a work machine, comprising: receiving a demand for acceleration from an operator acceleration input device; adjusting a transmission ratio until the engine is operating at a full load condition whilst maintaining a current engine speed; and, once the engine is operating at the full load condition, increasing the engine speed towards peak power whilst maintaining the full load condition.

The present disclosure provides a method of determining an effective load on an engine of a vehicle comprising: adjusting a transmission ratio whilst remaining at a current engine speed; monitoring the initial acceleration response resulting from the adjusted transmission ratio; obtaining an engine load at the current engine speed; and, using the monitored initial acceleration response and engine load to determine an effective load on the engine.

The present disclosure provides a control system configured to carry out any methods provided within the present disclosure.

The present disclosure provides a control system for controlling the acceleration of a vehicle, comprising: a processor; and a memory storing a computer program that, when executed by the processor, causes performance of a method as disclosed herein.

The control system may further comprise: one or more modules configured to sense, measure or determine vehicle operating parameters for the processor to carry out the method. The one or more modules may comprise an electronic control unit, ECU. The electronic control unit may comprise one or more of an engine ECU, a transmission ECU, an operator acceleration input device ECU, and a vehicle ECU.

The control system may comprise a bus for receiving and sending data between the modules. The bus may comprise a control area network, CAN, bus.

The present disclosure provides a vehicle comprising: a prime mover; a transmission in which the transmission ratio is configured to be controlled via a controller; and, the control system described herein. The controller may comprise the processor and memory as described herein.

The transmission may comprise and continuous variable transmission, CVT. The CVT may comprise a hydrostatic CVT.

The engine may be operated at an engine speed wherein the engine speed may be controlled by the processor and/or controller.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF DRAWINGS

Embodiments will now be described by way of example only with reference to the accompanying figures, in which.

DETAILED DESCRIPTION

In the following detailed description, numerous specific details are set forth in order to provide a thorough understanding of various embodiments and the inventive concept. However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may have not been described in detail.

In this disclosure, the term transmission ratio may refer to a specific transmission ratio or a transmission ratio gradient. The transmission ratio may be understood to mean the gear ratio. Although the disclosure primarily relates to continuous variable transmissions, CVT, it will be appreciated that the inventive concepts disclosed herein may be applicable to other forms of variable transmissions such as conventional auto powertrains or drive lines.

The CVT will comprise an input shaft and an output shaft. The transmission ratio of the output shaft to the input shaft, that is, the output shaft speed divided by the input shaft speed. A typical range of transmission ratio is between 0 and 2.5 for a tractor vehicle, but this is not a limitation and other ratios are possible. The transmission ratio of the CVT may be changed by a discrete amount or a rate of change. The rate of change of transmission ratio may be referred to as gradient and may be positive or negative.

Figure 1:
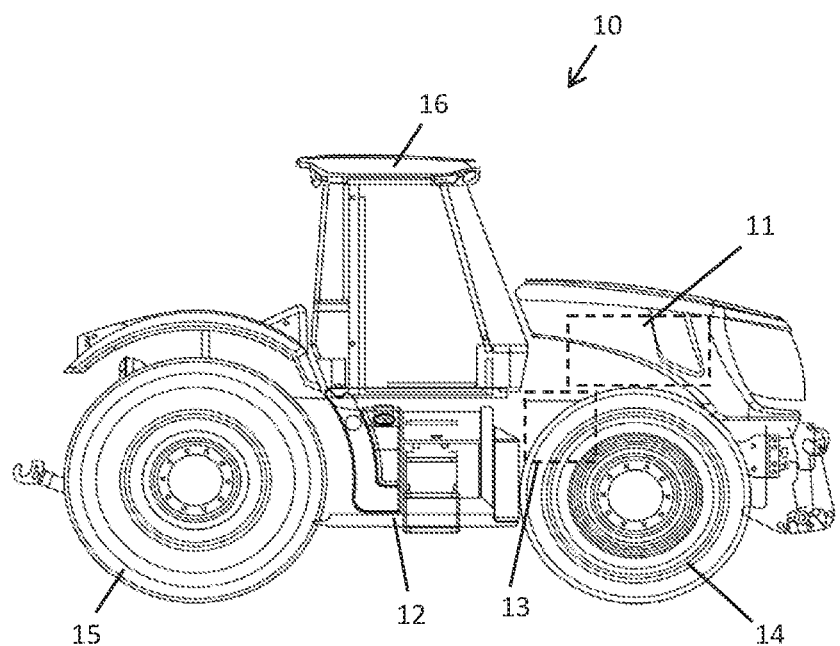
FIG. 1 shows an example of a work machine.

Referring to FIG. 1, there is shown a vehicle 10 which includes a frame structure 12 which in this example includes a chassis and body. The frame structure 12 carries a ground engaging structure which in this example includes a front axle carrying a pair of steerable front wheels 14 and a rear axle carrying a pair of non-steerable rear wheels 15.

In the example, the rear wheels 15 are driveable via a continuous variable transmission 13 by a prime mover, which in the present example is an internal combustion engine 11. In some example all four wheels or indeed only the front wheels 14 may be drivable, depending on the kind of vehicle to which the invention is applied.

The vehicle 10 further includes an operator's cab 16 from where the vehicle 10 may be driven, there being within the cab 16 a steering control e.g. steering wheel or joystick, and an acceleration input device such as a foot pedal or joystick. The speed of the vehicle 10 may be changed by the operator operating the acceleration input device which causes the vehicle control system to adjust the transmission ratio between the engine and the driven wheels 15 and/or to increase the engine speed.

The CVT may be any suitable CVT and may be mechanical, electrical or hydraulic based. In the described example, the CVT may be assumed to be a hydrostatic drive in which a variable displacement hydraulic pump and motor are controlled to provide a desired gear ratio, typically by adjusting the swash plate angle within the pump. Hence, the adjustment of the transmission ratio may comprise the control system altering the swash plate angle by a predetermined amount or at a predetermined rate.

As will be appreciated, the engine speed and transmission ratio are independently adjustable. The speed of the engine may be controlled by a controller via a conventional control area network bus. The speed of the engine may also be controlled by an operator input device such as a throttle pedal or lever with a range that can be changed. However, it will be appreciated that the engine speed operator input device may be overridden by the controller to enable the control system to control the engine response in accordance with the methods disclosed herein.

It will also be appreciated that an operator acceleration input device may be a foot pedal which is not directly connected to the engine speed as is the case in many automobiles. However, as noted below, the position of the operator acceleration input device may be associated with a desired engine speed.

The vehicle control system is described in more detail further below in connection with FIGS. 11 and 12.

The vehicle shown in FIG. 1 is a work vehicle in the form of a tractor, but the present disclosure may be applied to other forms of vehicle where appropriate. The types of vehicle may comprise any with an automatic drive line and an engine with a torque curve.

The present disclosure provides a way of responding to a demand for acceleration in an improved way. The disclosed method ensures that an instant response to the acceleration demand is experienced by the operator which is in contrast to the state of the art systems. The present disclosure also provides a way of ensuring that the acceleration is smoothly and continuously applied for the duration of the acceleration thereby improving the operator experience and preventing unnecessary transient loading on the engine or transmission systems. Further, the present disclosure provides an engine control method that provides greater fuel efficiency as the operation of the engine during an acceleration event may be predominantly executed at a full load operating point, rather than peak power.

The present disclosure provides a method of controlling the acceleration of a work machine in which, following an acceleration demand, a control system is configured to instantaneously apply transmission ratio without changing the engine speed. The increase in transmission ratio results in an immediate acceleration for the operator whilst increasing the load on the engine. The increase in load moves the engine operating point towards a full load condition and, if required, operation on the full load curve. The increase in transmission ratio and resultant acceleration may provide an insight into an effective load on the engine. The effective load may be used to influence the ongoing selection of transmission ratio and/or to determine whether the acceleration demand can be managed with or without an increase in engine speed.

In some scenarios, the provision of increased transmission ratio and the resultant increase in load is sufficient to meet the acceleration demand without increasing engine speed. In other scenarios, the increase in load may not be sufficient to meet the acceleration demand and the engine speed will need to be increased to provide additional power. In this latter scenario, once the engine is operating on the full load curve, the engine speed may be increased towards peak power, thereby providing the required power.

Figure 2:
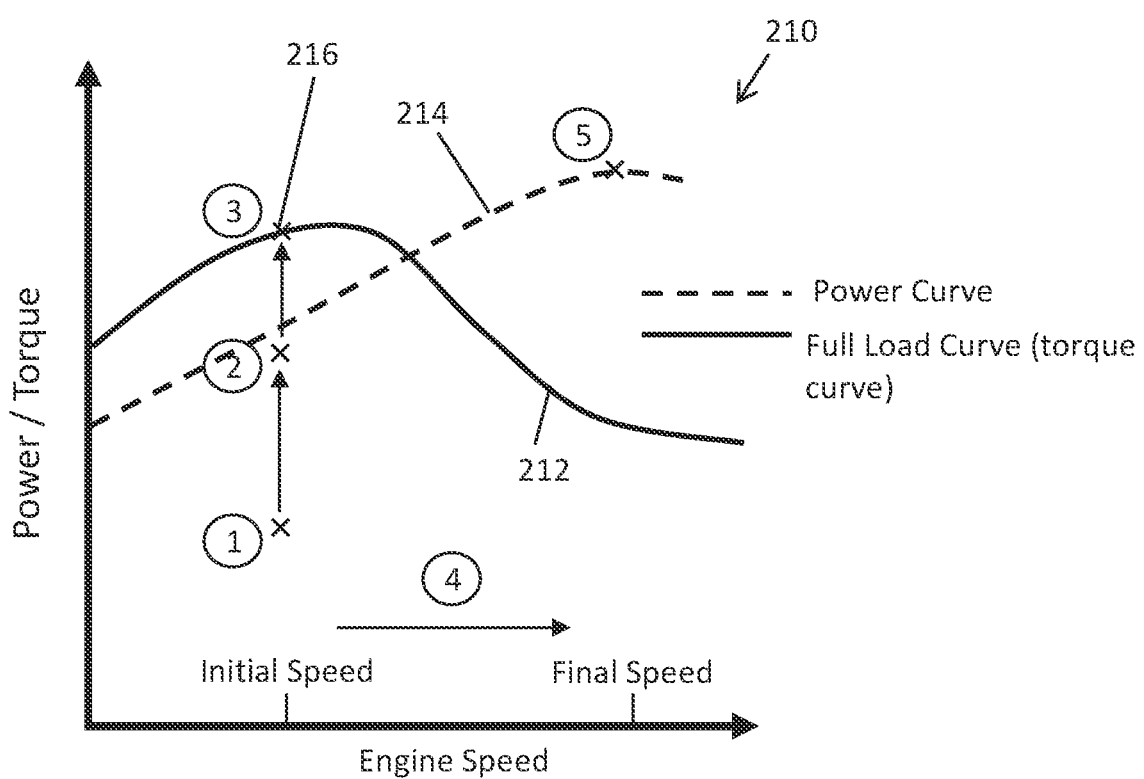
FIG. 2 shows a load curve for a work machine according to the present disclosure.

FIG. 2 shows a nominal example of a full load curve 210 for a work vehicle in which the engine speed is provided on the x-axis and torque/power are shown on the y-axis. The solid line 212 represents the engine load (i.e. torque) with the dashed line 214 representing power. It will be appreciated that the shape of the plotted lines is arbitrary and provided merely as an example.

Point 1 represents an initial operating condition of the engine in which the engine is operating at an initial speed and in steady state. The load on the engine is below the peak torque value 216 for the engine speed. Following an operator acceleration demand, transmission ratio is applied to the transmission 13 which result in an initial acceleration and increased load on the engine 11 such that it is operating at point 2. In instances where the latent engine load at the current engine speed is sufficient to meet the acceleration demand, the load may remain at point 2. In the case where further load is required, the ratio may be continually increased until the engine is at the full load operating point, shown at point 3. If the full load at that engine speed remains insufficient, the engine speed may be increased 4 until sufficient power has been provided to meet the acceleration demand. In some instances, this may require the engine speed to be accelerated to peak power, represent by point 5.

By increasing the transmission ratio upon receiving an acceleration demand whilst keeping the engine speed unchanged, it is possible to provide acceleration more readily and give an instant response to the operator. By delaying an increase in engine speed until the full load condition is met, both before increasing engine speed and also whilst the engine speed is being increased, it allows the engine to be operated more efficiently.

Hence, the present invention provides a method of controlling the acceleration of a work machine, comprising: receiving a demand for acceleration from an operator acceleration device and adjusting a transmission ratio to provide an instantaneous acceleration in response to the acceleration demand at a current engine speed. The method also optionally comprises increasing transmission ratio until the engine is operating at a full load condition whilst maintaining a current engine speed; and, if required once the engine is operating at the full load condition, increasing the engine speed towards peak power whilst maintaining the full load condition.

The adjustment of the transmission ratio following the initial transmission ratio may be referred to as a loading transmission ratio. The transmission ratio may comprise a transmission gradient, i.e. a per second rate of change of transmission ratio, and may comprise adding transmission ratio or removing transmission ratio. The initial transmission ratio may be continually applied until the full load condition is met.

A consideration when increasing the transmission ratio and engine speed to meet an acceleration demand is the load being experienced by the engine. The load may be affected, for example, by the type of and/or topology of and/or change in the terrain, and/or whether the vehicle is towing or has a work implement operating or in the ground etc. For example, where a vehicle is travelling at steady state on an incline, the load will be increased due to the incline compared to the same vehicle travelling on the flat or downhill. If an operator demands acceleration in each of these scenarios, the ability of the engine to achieve the acceleration at the existing engine speed will be greatly affected. In the scenario where the vehicle is ascending an incline, it is likely, depending on the gradient, power to weight ratio of the vehicle, current load on the engine and engine speed etc., that the full load at the given engine speed will be insufficient and the engine speed will need to be increased. In an example where the vehicle is descending, the engine may be able to provide ample load with no increase in engine speed.

The variation in the operating conditions and the resultant changes this has on the demand on load may be referred to herein as an "effective load" or "effective load condition". The effective load or effective load condition represents an operating condition of the vehicle and determines how effective a change in transmission ratio is at meeting a demand for acceleration.

In order to account for the effective load, the vehicle control system may be configured to determine the effective load on the engine when an acceleration demand is received. In doing so, the control system may be able to determine whether the engine is capable of meeting the acceleration under the load conditions with or without increasing the engine speed.

The effective load of an engine may be determined by the vehicle acceleration vs engine load. This is in contrast to the engine load which is conventionally determined and obtainable with other engine management data from an engine ECU or elsewhere.

Additionally or alternatively, the control system may be configured to determine what loading transmission ratio should be applied to allow the necessary torque and power to be provided whilst providing continuous acceleration when operating within the constraints dictated by the effective load. In some embodiments, the transmission ratio may be applied in dependence of the effective load without determining what the effective load actually is. As such, the effective load may be determined directly by the control system or be implicitly taken into account in the application of the appropriate transmission ratio without specifically quantifying or determining an actual "effective load".

In order to determine the effective load and/or a required transmission ratio when acceleration is demanded, the control system may be configured to apply an initial transmission ratio which will result in an initial acceleration. The resultant amount of initial acceleration will be inherently dependent on the effective load under which the vehicle and engine is operating thereby allowing the control system to determine what the effective load is and/or determine what transmission ratio should be subsequently applied to maintain a continuous acceleration.

The present disclosure provides a method of determining an effective engine load of a work vehicle comprising: adjusting a transmission ratio whilst remaining at a current engine speed; monitoring an initial acceleration response resulting from the adjusted transmission ratio; and, using the monitored initial acceleration response and engine load to determine an effective load on the engine.

The present disclosure also provides a method of determining a transmission ratio for a work vehicle comprising: adjusting a transmission ratio whilst remaining at a current engine speed; monitoring an acceleration response resulting from the adjusted transmission ratio; and, using the monitored initial acceleration response to update the transmission ratio. The transmission ratio may be the initial transmission ratio or the loading transmission ratio. Hence, the present disclosure provides a method of continually updating the transmission ratio using the acceleration response of the vehicle.

Figure 3:
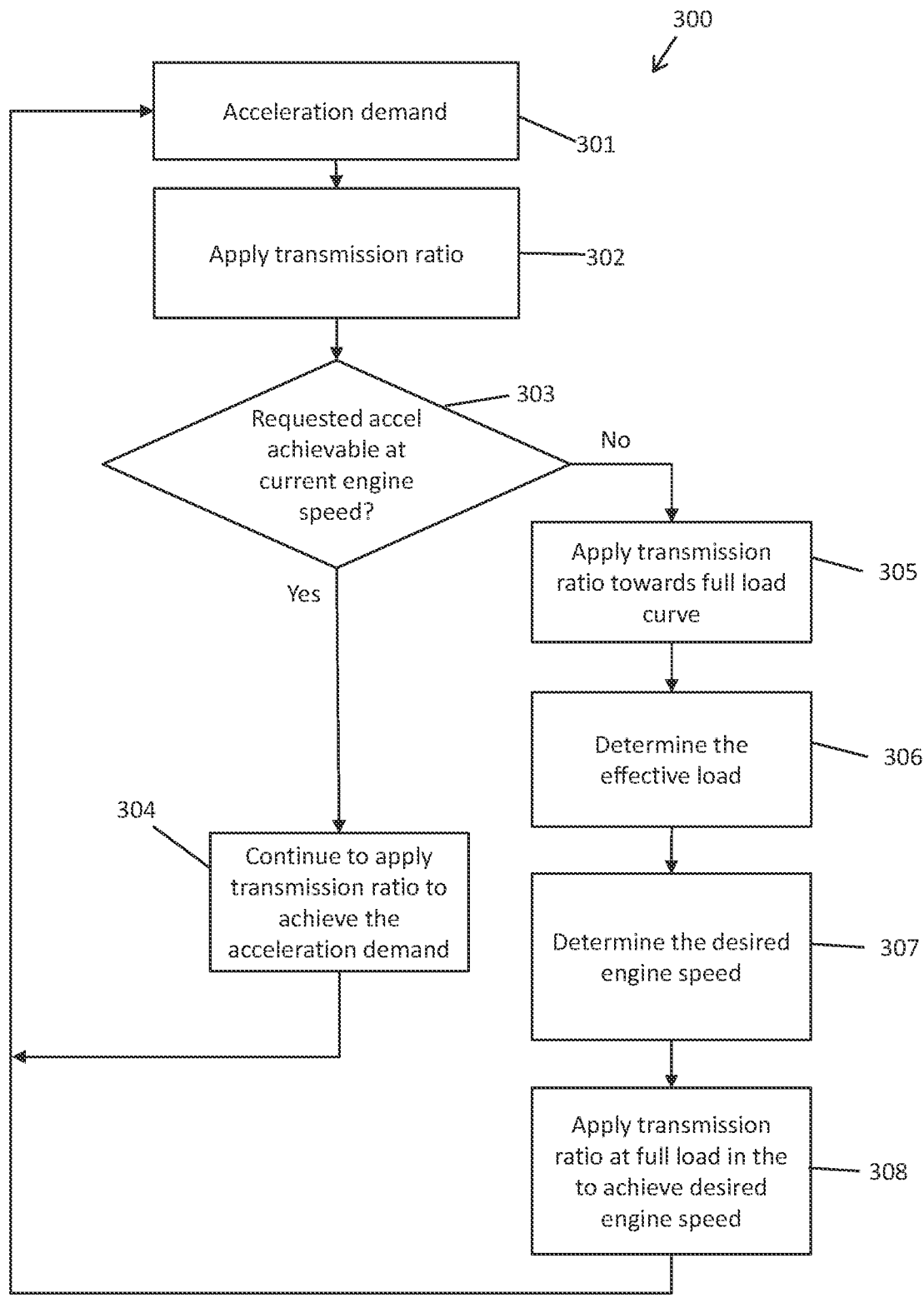
FIG. 3 shows a flow diagram of a method of controlling acceleration according to the present disclosure.

FIG. 3 shows a flow diagram demonstrating a method 300 of controlling the acceleration of a vehicle according to the present disclosure. At step 301, the operator of the vehicle demands an acceleration by, for example, depressing an accelerator pedal within the operator cab 16. The control system is configured to respond to the demand by applying a transmission ratio at a predetermined rate whilst maintaining the current engine speed causing the vehicle to accelerate, step 302.

Following the initial adjustment to the transmission ratio, the control system determines whether the demanded acceleration has been achieved with the initial transmission ratio, 303. If the demand has been achieved, the rate at which the transmission ratio is increased may be maintained to provide the demanded acceleration 304. If the acceleration has not been achieved, the increase in transmission ratio may be continuously applied until the engine 11 is operating on the full load curve 305, as shown by point 3 in FIG. 2.

It will be appreciated that, if the acceleration demand is maintained the load on the engine will increase due to the acceleration and increased vehicle speed. Hence, where the initial transmission ratio was sufficient to meet the initial acceleration, the initial transmission ratio will no longer be sufficient after a period of sustained acceleration and the method will move from 304 to 305 at step 303.

During the initial increase of the transmission ratio 302, or the subsequent increase in transmission ratio 305, the control system may be configured to determine the effective load on the engine 11 using the initial acceleration response of the vehicle 10 which results from the initial application of the transmission ratio 306. The effective load may be subsequently used to determine a desired engine speed required to meet the acceleration demand 307. Once the engine speed is determined, the transmission ratio may be applied to maintain full load to achieve the desired engine speed 308. As will be noted, the control loop continuously monitors for changes in acceleration demand and the effective load such that the transmission ratio can be continuously adjusted as required. Thus, the control system may be considered to be dynamic.

Figure 4A:
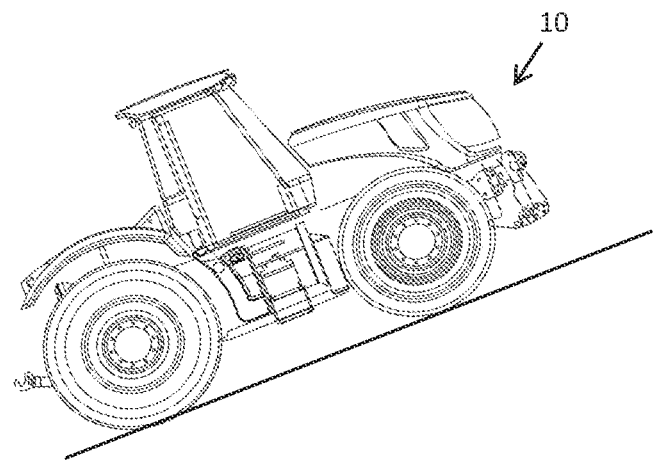
FIGS. 4a to 4c show a use case of a work machine ascending an incline during an acceleration demand.
Figure 4B:
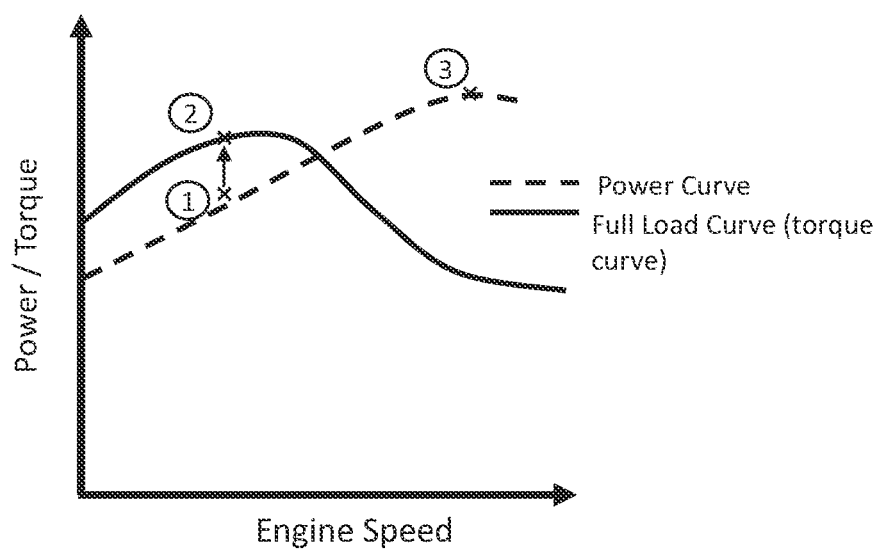
Figure 4C:
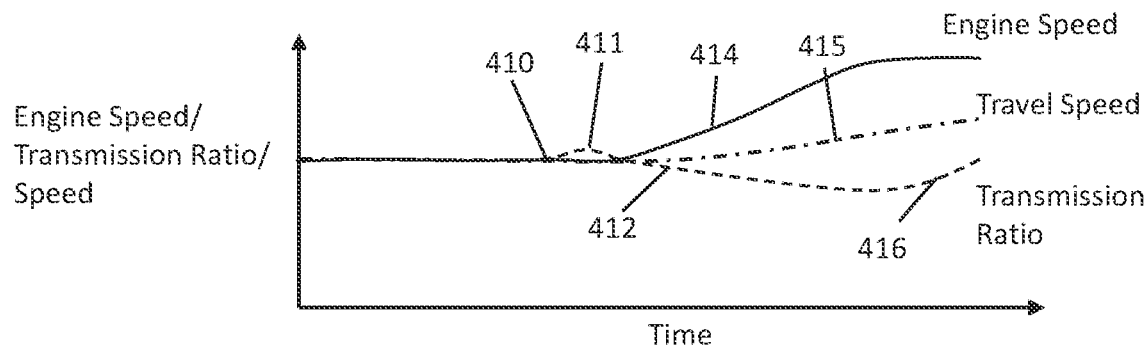

FIGS. 4a to 4c and 5a to 5c show two scenarios in which the transmission ratio is varied in response to an initial acceleration response from an initial increase in transmission ratio. With reference to FIGS. 4a-c, there is provided a vehicle travelling up an incline at a steady state with the engine 11 operating at point 1. The operator may depress the accelerator pedal at point 410 thereby demanding an acceleration. Upon detecting the acceleration demand, the control system increases the transmission ratio 411 to provide an immediate acceleration response and increase the load to the full load operating point for that engine speed at point 2 on the full load curve.

As the engine reaches the full load operating point, point 2, the engine speed is increased by reducing the transmission ratio 412. It will be appreciated that the reduction in transmission ratio and increase in engine speed 414 is managed such that the initial acceleration may be maintained and the increase in speed is continuous. Once the desired engine speed has been reached, which is peak power in this instance indicated at point 3, the engine speed flattens out. At this point, because the engine is operating at full load and peak power, the transmission ratio would also be reduced. However, FIG. 4c shows an increase to the transmission ratio at 416 which may be applied if the load changes, for example, if the terrain flattens out.

Figure 5A:
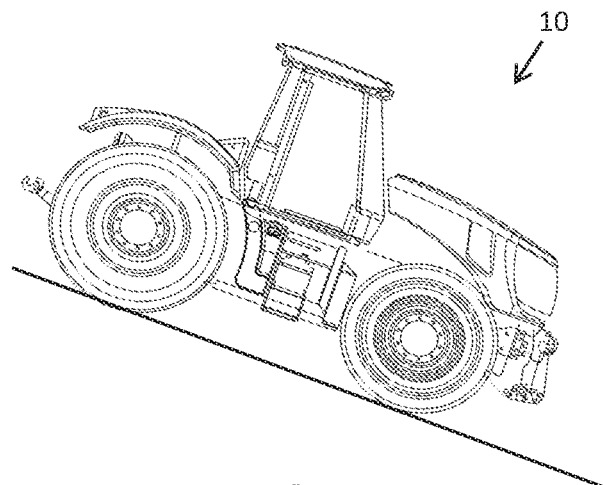
FIGS. 5a to 5c show a use case of a work machine descending an incline during an acceleration demand.
Figure 5B:
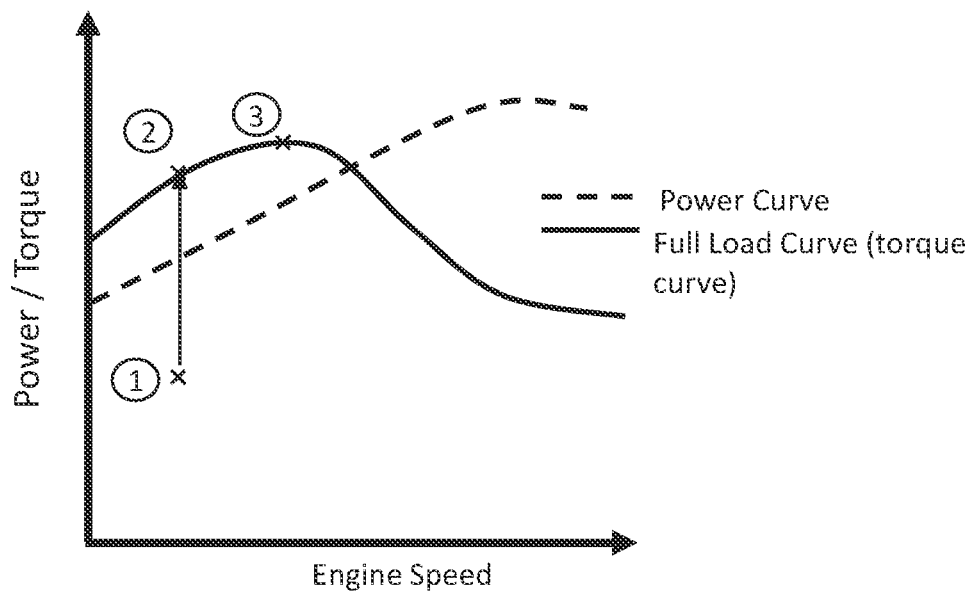
Figure 5C:
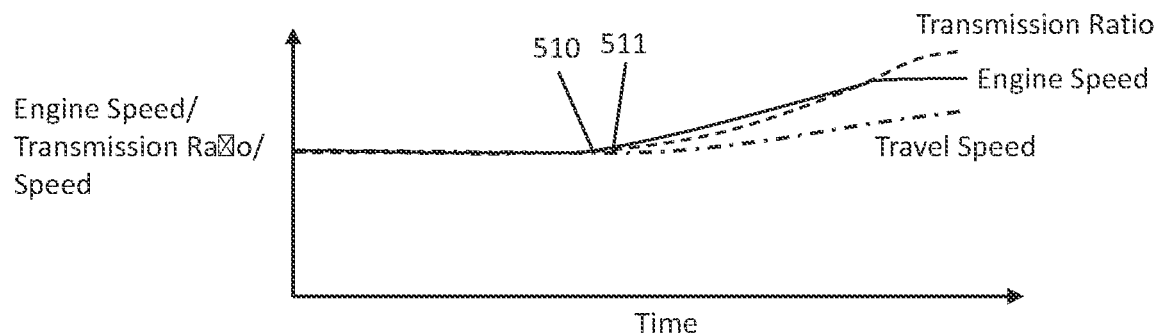

In FIGS. 5a-c, there is provided a vehicle 10 descending an incline at a steady speed with the engine operating at point 1. At point 510, the operator depresses the accelerator thereby demanding an acceleration. Upon detecting the acceleration demand, the control system increases the transmission ratio 511 to provide an immediate acceleration response and increase in load to point 2. As the engine 11 reaches the full load operating point for the given engine speed, the engine speed is increased. As the effective load on the vehicle 10 is relatively low due to the decline, the transmission can be continually increased with the engine speed until the desired engine speed has been reached.

In both of these scenarios it can be seen that transmission ratio has been adjusted in keeping with the effective load and smoothly controlled to provide a constant acceleration from the moment that the accelerator is depressed, with the engine speed being increased once the engine is operating at the full load condition.

Figure 6:
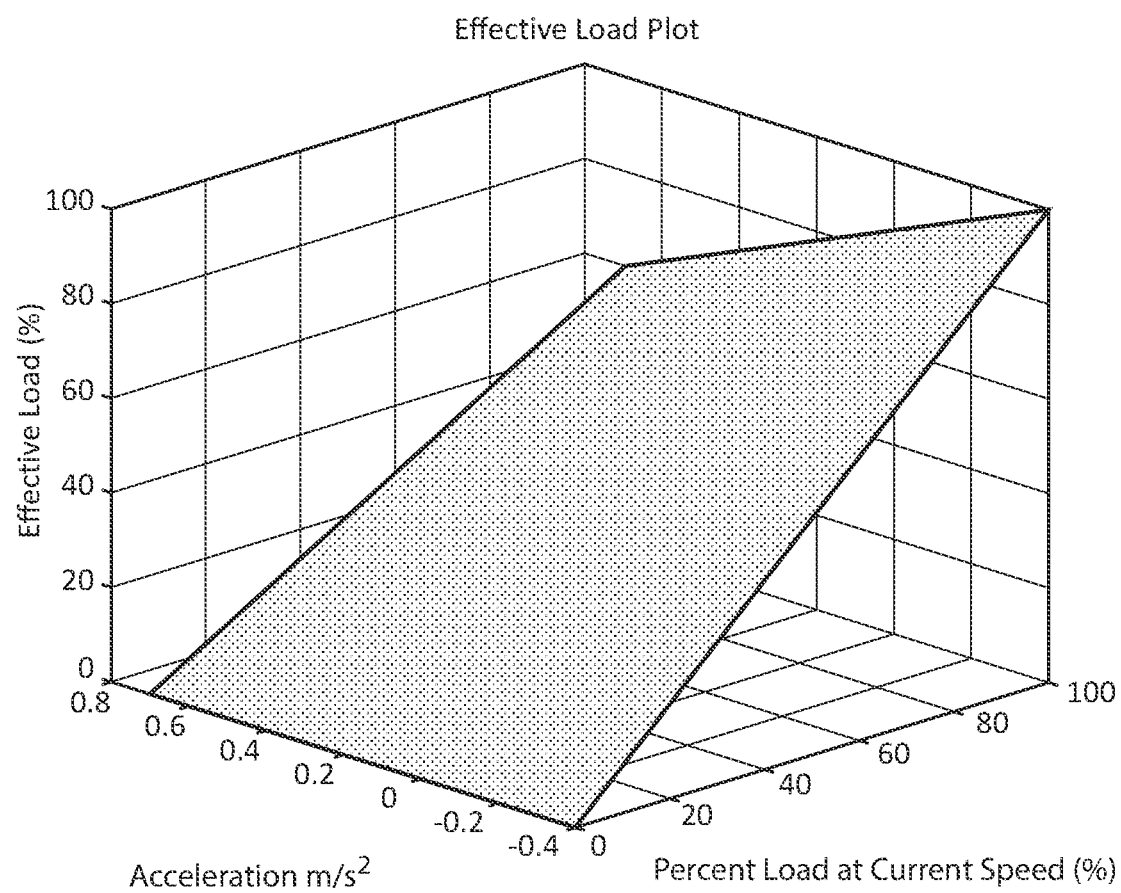
FIG. 6 shows a plot for determining an effective load of a work machine.

The determination as to whether the requested acceleration is achievable at the current engine speed may be carried out using the percentage load of the engine and the current engine speed together. FIG. 6 shows a plot in which acceleration of the vehicle is shown in the x axis, the percentage load on the engine is shown on the y-axis, and the effective load is shown in the z-axis. The plot may provide the basis for a look-up table from which, for a given acceleration resulting from the initial application of transmission ratio and the percentage figure of the load, it is possible to determine the effective load on the engine.

Thus, for example, where there has been an initial acceleration of 0.2 m/s$^2$ following an initial increase in transmission ratio and the load on the engine is known to be 60%, it may be possible to determine an effective load of 37%.

It is of note that the plot includes negative values of acceleration which may occur when the effective load changes, for example, if the engine is at full load and the vehicle starts ascending an incline.

Once the effective load has been determined, the control system may use it to determine whether the demanded acceleration can be met at the current engine speed, and, if not, what engine speed is required to provide the demanded acceleration. To determine the desired engine speed, the control system may be provided with a look-up table which includes the engine speed and effective load extending between 0 and 100% for example. If the effective load is low, then the engine may be operated on peak torque without a change in the engine speed. If the effective load is high, then the engine may be operated at peak power. It will be appreciated, that the specific engine speed required may be determined and the disclosure is not limited to determining the full load or peak power.

Once the desired engine speed has been determined, the control system may determine at what rate the transmission ratio should be applied to provide a continuous acceleration from the existing engine speed and load to the desired engine speed and load.

As noted in FIG. 3, where an increase in engine speed is required, this may be provided once the engine is operating on the full load curve, thereby maximising the efficiency of the engine output during an acceleration event.

The determination of whether an acceleration demand can be met whilst the engine is operating at a given speed and/or what engine speed is required, can be achieved using suitable look-up tables. Thus, for a given acceleration demand, e.g. pedal position and effective load, it is possible to look-up a required engine speed/power output.

The method shown in FIG. 3 is an iterative control method in which the acceleration demand and the effective load are continually monitored. As such, the initial acceleration with respect to an initial increase in transmission ratio may be understood to be with respect to that iteration of the control loop. Hence, in the situation where the effective load changes during an acceleration demand, for example where the topology of the terrain changes or there is some variance in load from the engagement of an in-ground tool, the system will recalculate the rate at which the transmission ratio needs to change to provide a smooth application of acceleration.

As noted, upon receiving an initial demand for acceleration, the control system is required to provide an increase in transmission ratio to provide the initial acceleration. However, until the effective load is known there is no way of determining what the initial application of transmission ratio should be applied.

To address this, the control system may be configured to select a nominal increase in transmission ratio which assumes a particular set of operating conditions to ensure a sensible amount of transmission ratio is applied. The initial transmission ratio may be applied using the acceleration demand, engine load, current vehicle speed and assuming the effective load is within a given range which will lead to a moderate amount of acceleration. Hence, for example, a look-up table comprising values of the transmission ratio gradient for different levels of vehicle speed and acceleration demand may be provided. The look-up table may be associated with the transmission ratio which would be applied if the effective load is within a predetermined range. The predetermined range may be selected according to the application or expected figure. In some examples, the effective load may be assumed to be between 40% and 60% of the total load, for example. Such a look-up table may be based on the plot shown in FIG. 8e, which is described in more detail below.

Figure 7:
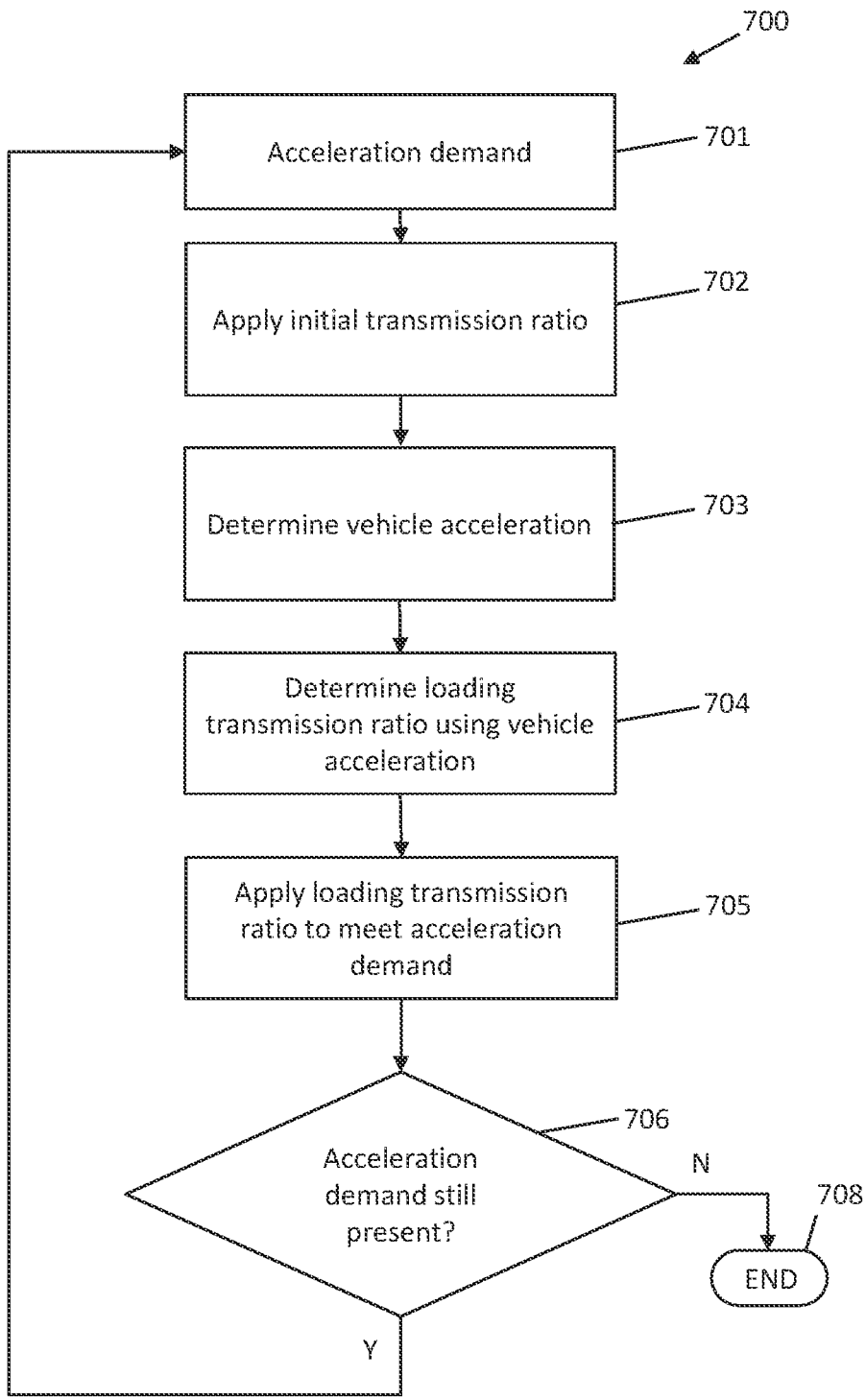
FIG. 7 shows a flow diagram of a method of controlling acceleration according to the present disclosure.

FIG. 7 shows a simplified method of controlling the acceleration of a vehicle in which the effective load is not explicitly determined. Rather, the transmission ratio is controlled in accordance with the acceleration experienced by the vehicle in response to the application of the transmission ratio. The method 700 comprises receiving an acceleration demand 701 from an operator and applying an initial transmission ratio to provide an initial acceleration response. The description of how to select the initial transmission ratio is described previously and not repeated further here.

The acceleration response is then determined by the control system using conventional means 703 and used to determine the subsequent transmission ratio to apply to maintain an acceleration 704. As noted in the examples of FIGS. 4a-c and 5a-c, the transmission ratio may be selected to move the operating point of the engine towards the full load curve prior to increasing the engine speed towards peak power. Where the engine is operating at or close to full load following the initial acceleration, the transmission ratio may be reduced to remove load and allow the engine speed to be increased. It will be appreciated than the reduction in ratio and increase in engine speed may be executed in such a way that an acceleration is constantly applied.

Once the loading transmission ratio has been determined, it may be applied by the control system 705.

If the acceleration demand is still present at 706, either the same or altered, the control system returns to step 701. It will be appreciated on subsequent iterations that the transmission ratio will be determine in relation to the existing transmission ratio from the previous iteration to provide a smooth transition between the two. Hence, step 702 may comprise applying a loading transmission which takes the existing acceleration and acceleration demand into account, rather than an initial transmission ratio which is the case when the vehicle has been previously operating in a steady state with no acceleration demand.

If the acceleration demand is removed, the control loop ends 708 until a further acceleration demand is made.

Hence, the present disclosure provides a method of controlling the acceleration of vehicle by determining an initial transmission ratio gradient and adjusting the transmission ratio gradient to provide a responsive acceleration in accordance with an acceleration demand.

The selection of the transmission ratio gradient may be made in accordance with a plurality of variables including one or more from the group comprising: acceleration demand; vehicle speed; an engine load; vehicle acceleration demand and engine speed error.

The transmission ratio or transmission ratio gradient may be selected using one or more look-up tables. The look-up table may be a four dimensional look-up table comprising: acceleration demand; vehicle speed; an engine load; and, vehicle acceleration. The look-up table may be five dimensional comprising: acceleration demand; vehicle speed; an effective load; vehicle acceleration and engine speed error.

Figure 8A:
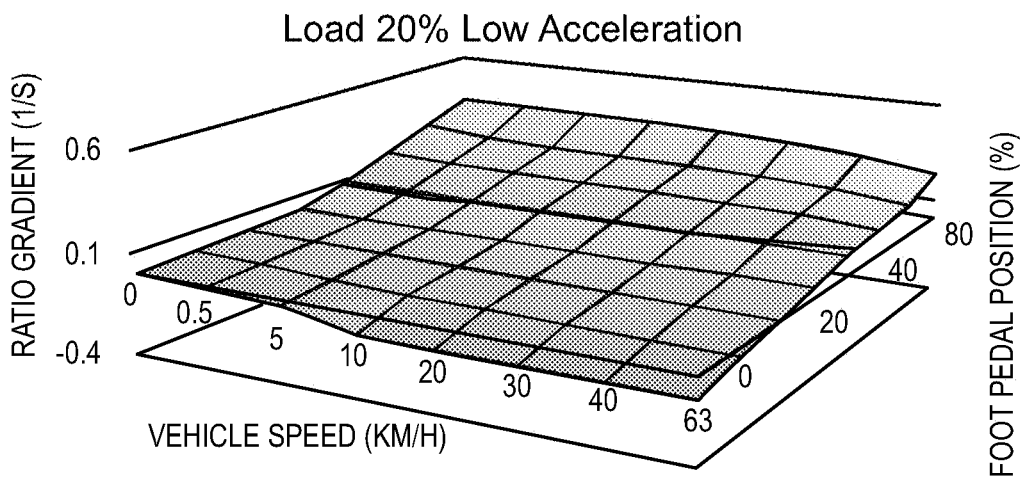
FIGS. 8a-8i show a matrix of plots representing look-up tables for determining a transmission ratio gradient in response to an acceleration demand.
Figure 8B:
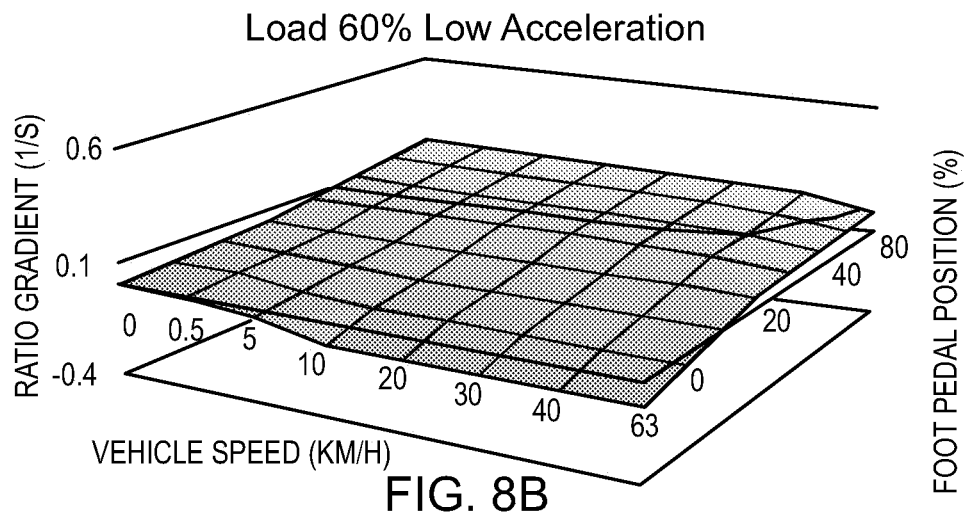
Figure 8C:
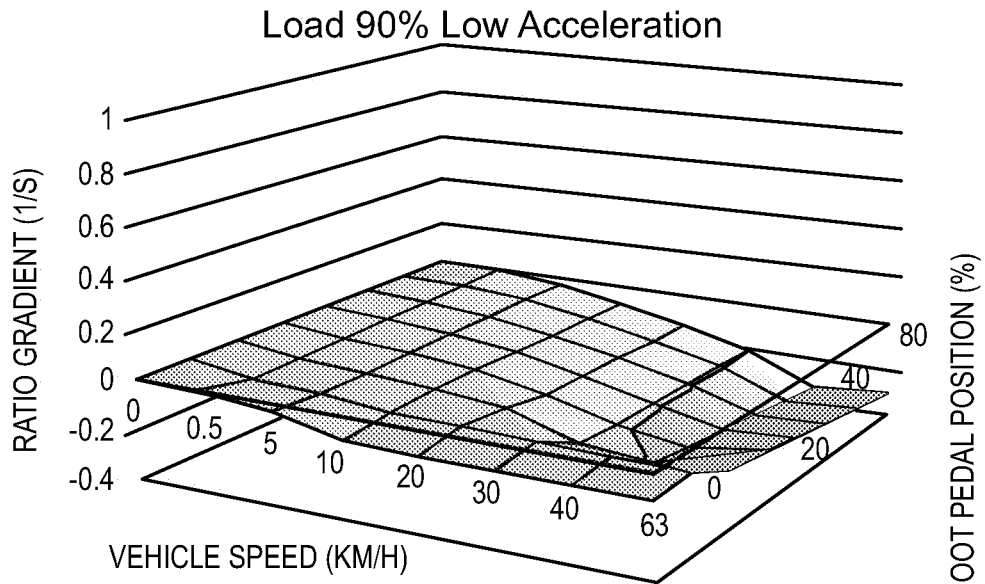
Figure 8D:
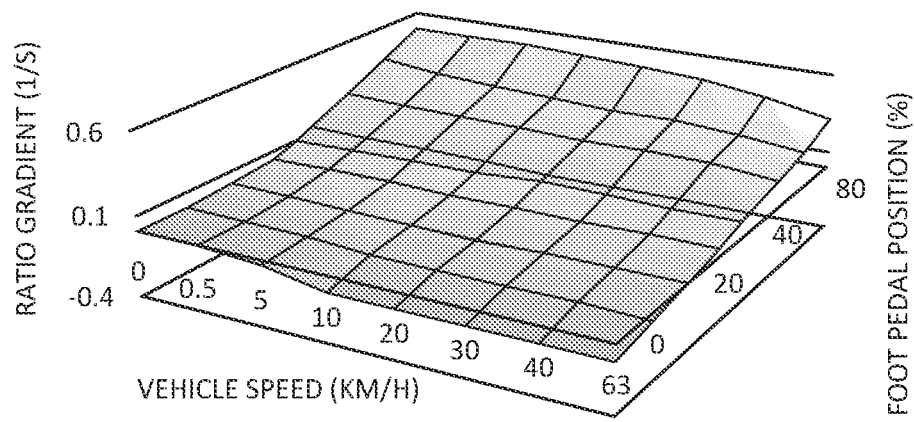
Figure 8E:
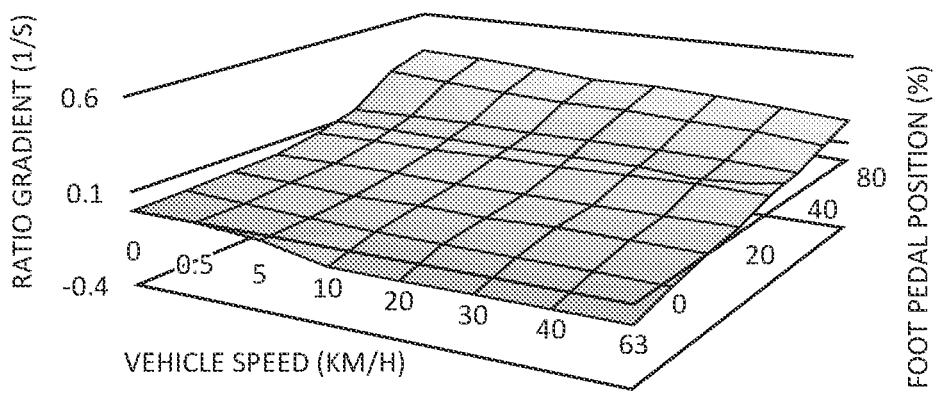
Figure 8F:
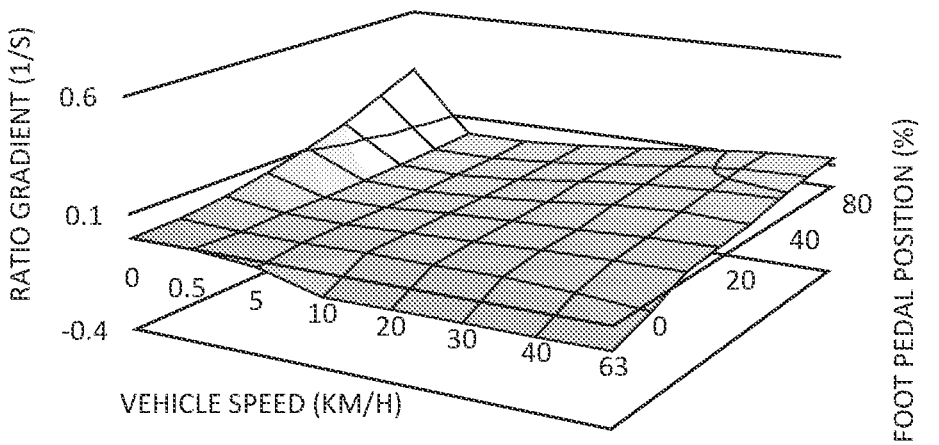
Figure 8G:
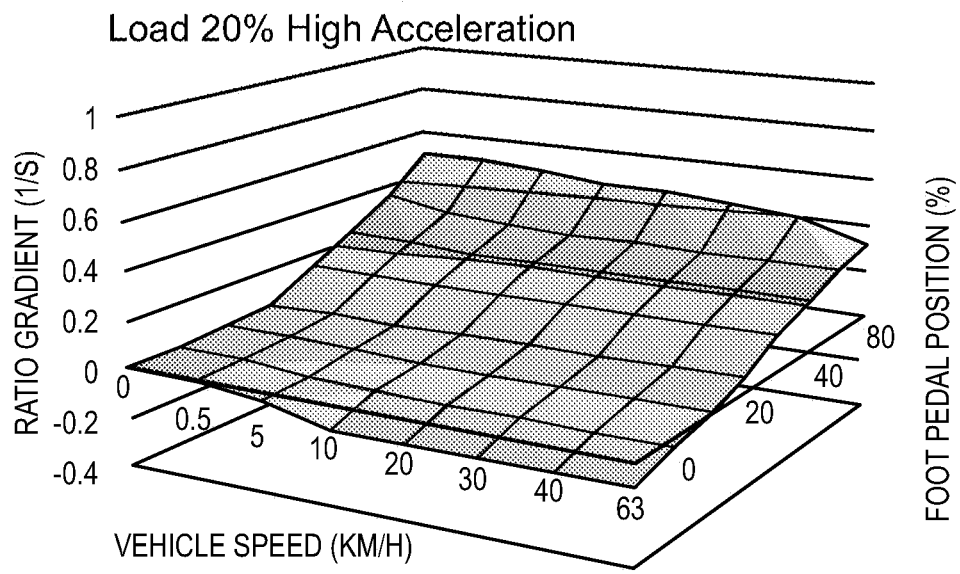
Figure 8H:
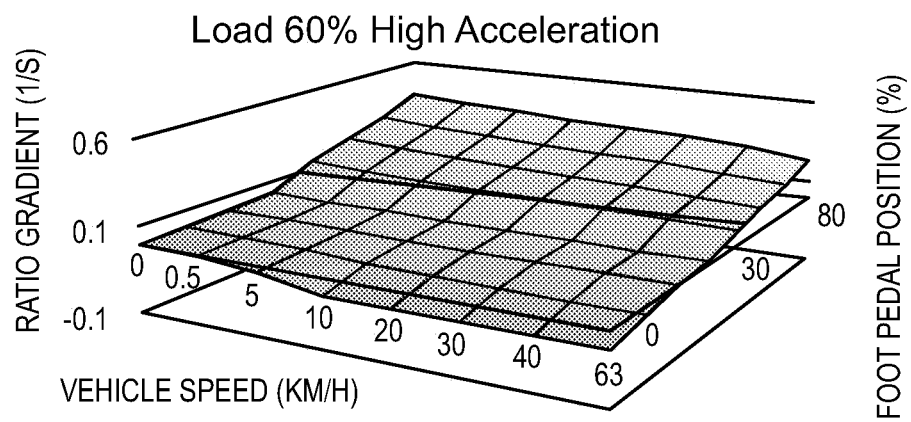
Figure 8I:
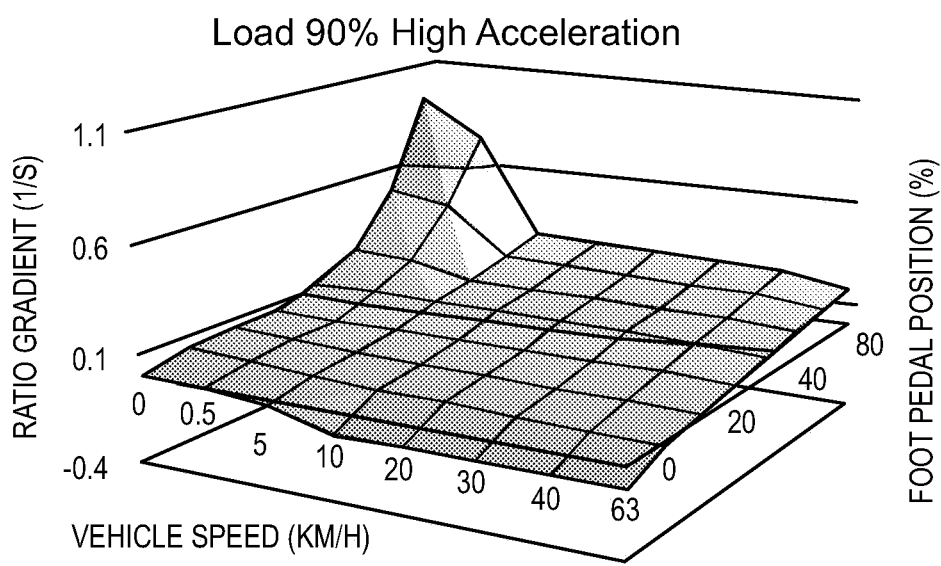

FIGS. 8a to 8i show a matrix of plots which provide the transmission ratio gradient on the basis of a plurality of accelerations and effective loads. Within each acceleration and load the specific transmission ratio gradient may be selected using an acceleration demand and a vehicle speed. Hence, FIGS. 8a to 8c show a first column of the matrix and include values of transmission ratio gradient for a low load e.g. 20% with low, medium and high levels of acceleration in the first to third rows respectively, FIGS. 8d to 8f show a second column which includes values of transmission ratio gradient for a medium load e.g. 60% with low, medium and high levels of acceleration demand respectively, and FIGS. 8g to 8i show a third column which includes transmission ratio gradients for high loads e.g. 90% with low, medium and high accelerations in each row. The accelerations chosen in this embodiment typically extend from $-9$ ms$^{-2}$ to 0.25 ms$^{-2}$ for low acceleration, 0.5 ms$^{-2}$ 0.7 ms$^{-2}$ for medium acceleration, and 1.5 ms$^{-2}$ to 2 ms$^{-2}$ for high acceleration. It will be appreciated that the range of loads and accelerations may vary from the above values in accordance with a desired application or performance requirement.

The plurality of plots, which may be represented by and referred to as look-up tables, are used in conjunction to select a required transmission ratio gradient during an acceleration event. Hence, following an acceleration demand, an initial transmission ratio gradient is selected from within one of the look-up tables, typically FIG. 8e, which will provide an initial acceleration response on the basis of the vehicle speed and acceleration demand.

If the resultant acceleration response is high due to a low effective load the selection of transmission ratio gradient may move towards FIG. 8h which corresponds to a mid-range load and high acceleration. As the transmission ratio increases in keeping with the selected gradient, the load on the engine increases as the vehicle speed increases to transition the selection of transmission ratio gradient on to FIG. 8i, thereby moving through the look-up tables as the acceleration and effective load varies until the engine is operating on the high load tables which correspond to the full load curve.

So, for the example of FIG. 2, following an acceleration demand being received at point 1, the control system may be configured to obtain an initial transmission ratio gradient from a first look-up table in dependence of the acceleration demand and vehicle speed. The selection of the initial transmission ratio gradient may be based on an assumed medium effective load which is sufficient to provide the initial acceleration whilst minimising a drop in engine speed (for example, if the engine is already close to full load) to provide a notable increase in acceleration for the operator. Hence, of the look-up tables shown, the control system may be configured to select a transmission ratio gradient from FIG. 8e. As the transmission ratio and speed of the vehicle increases, the operating point of the engine moves from point 1 to point 2 in FIG. 2, with the transmission ratio gradient being held substantially constant. As the load increases and the operating point of the engine moves from point 2 to point 3, the control system may be configured to select the transmission ratio gradient from look-up table represented by FIG. 8f, at which point the acceleration will begin to slow due to the available load being reduced. Once the acceleration has slowed sufficiently, the control system may move to the look-up table of FIG. 8c.

It will be noted that the transmission ratio gradient values in FIG. 8c are all negative corresponding to a removal of ratio and an increase in engine speed. The increase in engine speed will move the operating point 3 to point 5 in FIG. 1.

Similar operations may occur for FIGS. 4a-c and 5a-c. With reference to FIG. 4b, point 1 may correspond to the initial transmission ratio gradient selection from FIG. 8e which provides the initial increase in transmission ratio seen at 411 in FIG. 4c. As the vehicle is ascending an incline, the effective load is high and the acceleration is low which results in FIG. 8c being selected and the transmission ratio gradient being negative with ratio being removed to allow the engine speed to increase.

With reference to FIG. 5b, the initial transmission ratio gradient may be taken from FIG. 8e which provides a high acceleration and low effective load. This moves the selection on to FIG. 8g sequentially through FIGS. 8h and 8i which correspond to points 2 and 3 in FIG. 5b.

It will be appreciated that the transmission ratio gradients are arranged within each of the look-up tables to ensure there is a smooth transition between points as the vehicle operating point changes, and also that the transition between look-up tables is also smooth and continuous. In order to achieve this, from the discrete data points provided in the look-up tables, the control system may be configured to interpolate between adjacent data points in a given look-up table and between adjacent maps in the matrix.

The interpolation may comprise, for example, selecting corresponding values from adjacent look-up tables, e.g. medium acceleration and high acceleration for a given load, and interpolating between the two values. Hence, for example, if the medium acceleration look-up table is set at 0.5 ms$^{-2}$ and the high acceleration look-up table is set at 1 ms$^{-2}$ but the actual measured acceleration is 0.8 ms$^{-2}$, the control system may select corresponding values for the measured vehicle speed and acceleration demand from each of the medium and high acceleration look-up tables and interpolate between the two data points to obtain the transmission ratio which is suitable for the measured acceleration. A similar process may be carried out for the other variables used in the method. Hence, for example, the middle load look-up tables may be 60% load and the high load look-up tables may be 90%. If the actual engine load is 80%, the corresponding data points for vehicle speed and acceleration demand may be interpolated to provide the required value for 80% load.

The interpolation may be carried out using any suitable technique known in the art. The interpolation may comprise, for example: linear interpolation which assumes a slope between the two data points and selects the value at the appropriate point on the slope. Other methods of interpolation will be possible.

The various values in each of the look-up tables will be application specific and some trial and error to determine which values are preferable may be required.

Figure 9:
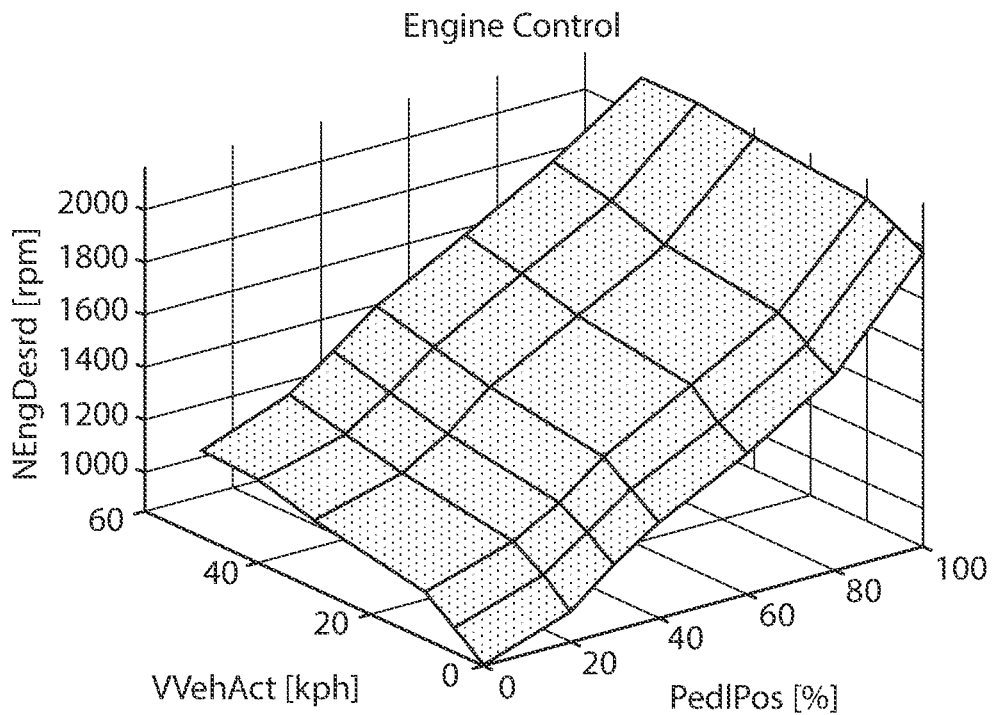
FIG. 9 shows a plot representing a look-up table for determining desired engine speed.

In order to provide a stable operation, the selection of the look-up tables may additionally be based on the difference between a desired engine speed and the actual engine speed, i.e. an engine speed error. In the described embodiment, the desired engine speed is a function of pedal position and vehicle speed as shown in FIG. 9. Hence, using the actual vehicle speed and desired engine speed, the error can be determined.

Figure 10:
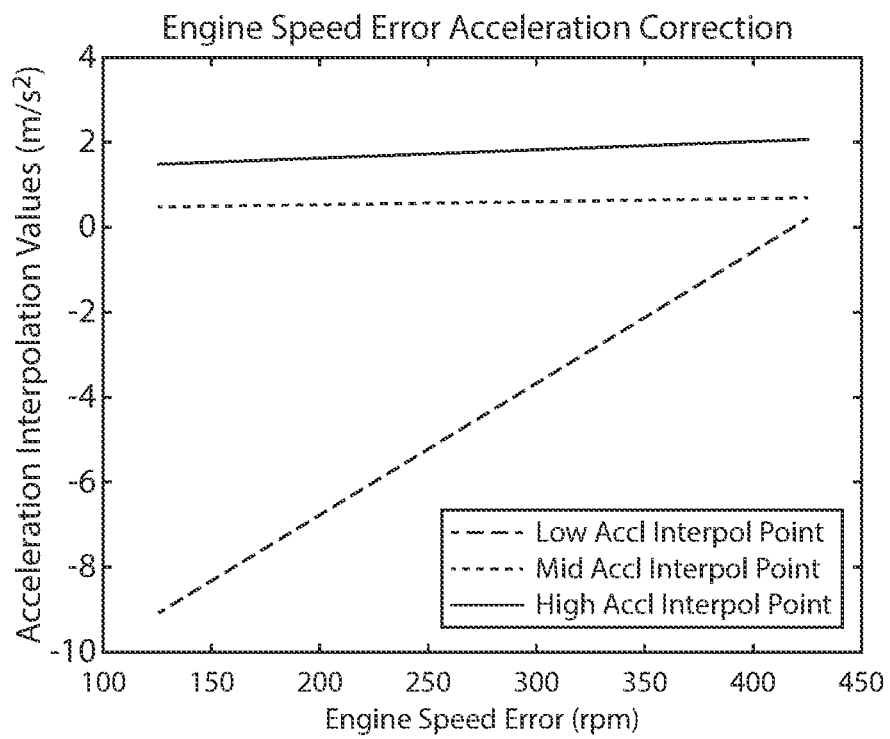
FIG. 10 shows a plot for adjusting the acceleration range in accordance with the engine speed error.

The engine speed error may determine which of the look-up tables is used and/or the amount which the look-up table influences the interpolation. In the described example, the engine error speed is used to alter the acceleration value which is associated with the look-up table. FIG. 10 shows a plot of the engine speed error on the x-axis and acceleration values on the y-axis. Hence, when the engine speed error is low, e.g. 125 rpm, the low acceleration value becomes $-9$ ms$^{-2}$, meaning that the look-up tables provided by FIGS. 8a to 8c are not used (given a 9 ms$^{-2}$ deceleration is highly unlikely). As the engine speed error increases, the low acceleration value is increased until, in the extreme case, it becomes 0.25 ms$^{-2}$, meaning that the look-up tables 8a to 8c will be more likely to be used. It will be seen that the magnitude of the mid and high acceleration values may also be modified in line with the engine speed error to help enable a continuous acceleration to be applied when the load and/or engine speed is being increased.

In the present example, taking the engine speed error into account allows the control system to selectively reduce the effect of or remove the low acceleration look-up tables from the interpolation calculation when the engine speed is close to the desired engine speed. Conversely, it allows the removal of transmission ratio sooner if the engine speed error is large. That is, if the difference between the desired engine speed and actual engine speed is large, it may be determined that the full load condition will not be met without increasing the engine speed. By making the low acceleration look-up tables more influential when the engine speed error is large, means their influence in the interpolation is greater and the transmission ratio is lowered or taken off sooner. Where the engine speed error is smaller, it is likely that the engine will be able to manage the acceleration demand using the mid and high acceleration look-up tables. The use of the engine speed error is also useful where the engine speed drops due to the effective load changing.

The vehicle of the present disclosure may comprise a control system which is configured to carry out the methods as disclosed herein. With reference to FIGS. 11 and 12, the control system may comprise one or more controllers which are configured to receive data from the various vehicle systems which obtain the required operating parameters and to execute the methods described herein.

Figure 11:
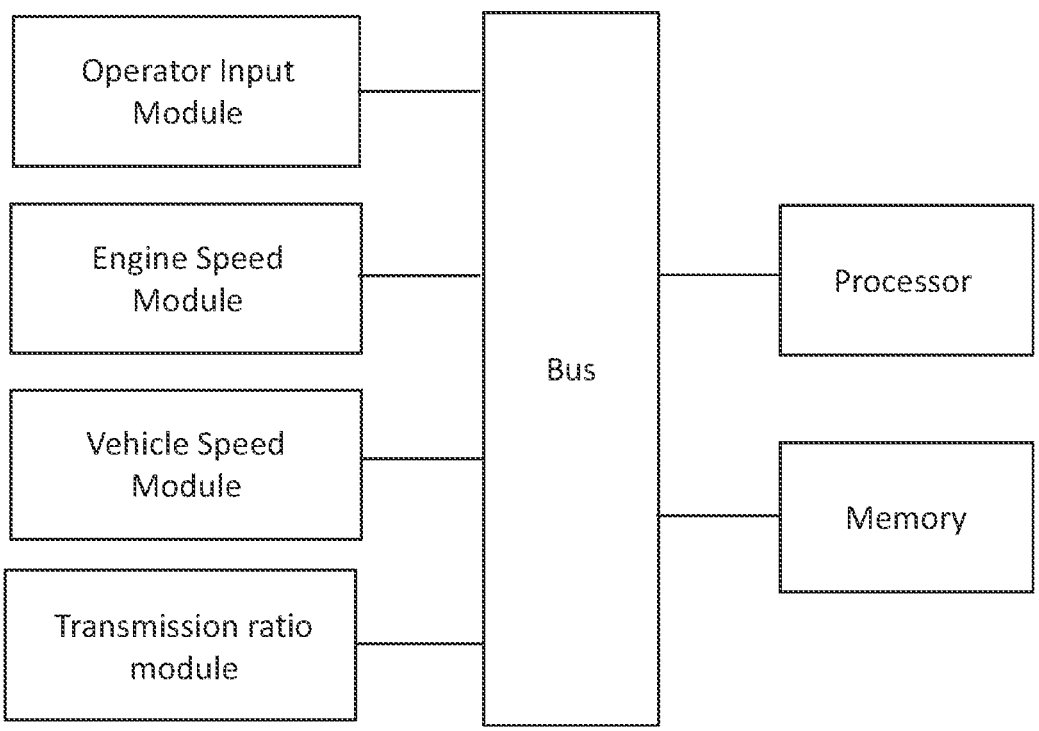
FIG. 11 shows a schematic representation of a control system for carrying out the methods disclosed herein; and, FIG. 12 shows a schematic representation of a vehicle control system according to the present disclosure.

FIG. 11 shows a schematic representation of a general control system which may be configured to carry out the methods as disclosed herein. The control system comprises: a processor, a memory, a bus, and a plurality of data acquisition modules comprising one or more sensors.

Figure 12:
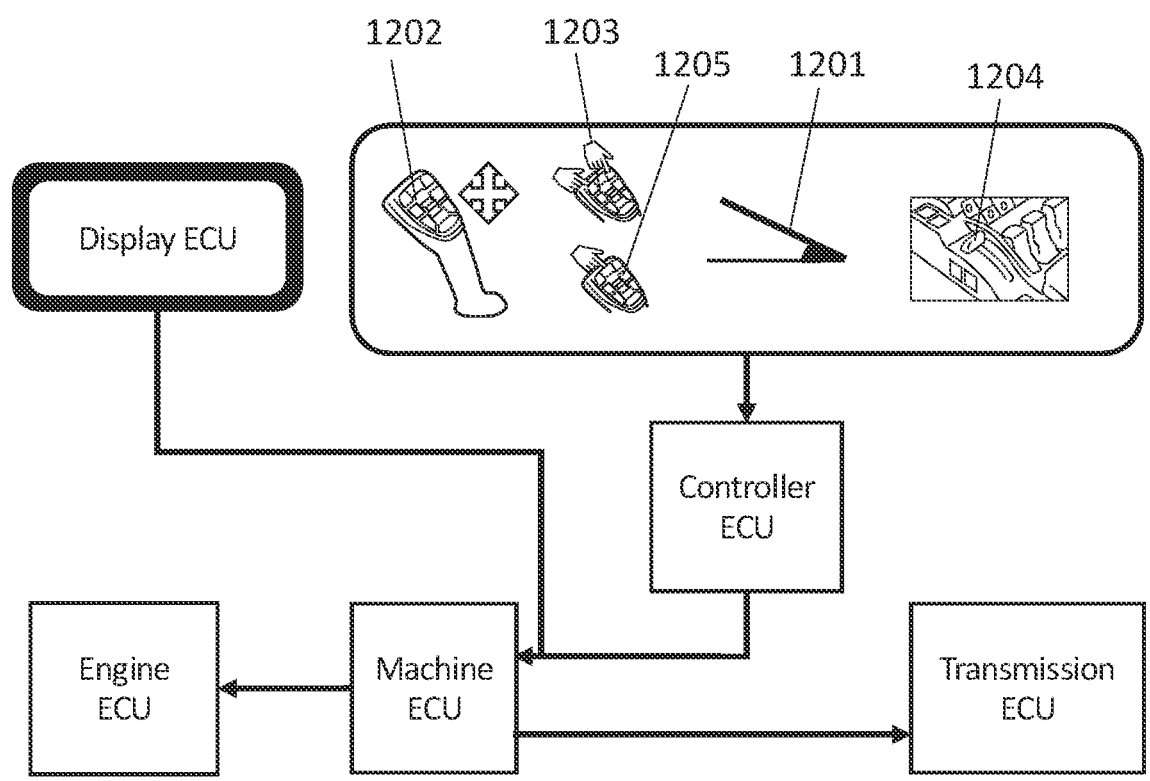

FIG. 12 shows a schematic representation of a vehicle control system which comprises a plurality of electronic control units, ECUs, as known in the art. As shown, there may be separate ECUs for controlling the engine, input devices (i.e. the controller ECU") and transmission, with a central vehicle or "machine" ECU which generally coordinates the control of the vehicle and data exchange between the different systems. In the present example, the machine ECU may receive vehicle data required to carry out the methods described herein, such as the position of the accelerator input device from the controller ECU, the engine data such as engine speed from the engine ECU, and transmission data, such as the vehicle speed, from the transmission ECU, etc. It will be appreciated that other configurations are possible.

The acceleration demand may be determined by using an appropriate sensor on the acceleration input device. For example, where the accelerator device is a foot pedal 1201, joystick 1202, a plurality of buttons 1203 (mounted on the joystick or otherwise) a lever 1204, roller 1205 (mounted on the joystick or otherwise) or other movable device, there may be a position sensor to determine the position of the input device relative to some datum.

At least one of the ECUs may be configured to determine and output the chosen transmission ratio as described herein. At least one ECU may be configured to control the engine speed.

Returning to FIG. 11, the processor may include at least one microprocessor and may comprise a single core processor or multiple processor cores (such as a quad core processor), or may comprise a plurality of processors (at least one of which may comprise multiple processor cores).

The memory may be any suitable non-transitory computer readable storage medium, data storage device or devices, and may comprise a hard disk drive (HDD) and/or a solid-state drive (SSD). The memory may be permanent nonremovable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The memory stores one or more computer programs comprising computer readable instructions that, when executed by the processor, causes performance of the methods described herein. The computer program may be software or firmware, or may be a combination of software and firmware. The memory may store the look-up tables as described herein and any further data required to execute the methods described herein.

The computer program may be stored on a non-transitory computer readable storage medium. The computer program may be transferred from the non-transitory computer readable storage medium to the memory. The non-transitory computer readable storage medium may be, for example, a Universal Serial Bus (USB) flash drive, a secure digital (SD) card, or an optical disc (such as a compact disc (CD), a digital versatile disc (DVD) or a Blu-ray disc). In some examples, the computer program may be transferred to the memory via a signal, such as a wireless signal or a wired signal.

The control system as shown in FIG. 11 comprises a plurality of modules which are configured to obtain or receive the vehicle operating data and/or execute any method described herein. The modules may comprise one or more sensors configured to obtain vehicle operating data. The modules may be configured to sense, measure or otherwise obtain or determine the data required for the performance of the methods described herein. In FIG. 11 the modules comprise: an acceleration input module for obtaining acceleration demand data, e.g. positional data of an acceleration actuator, an engine speed module for determining and controlling the speed of the engine, a vehicle speed module for determining the vehicle speed and acceleration, and a transmission ratio module for determining and controlling the transmission ratio. Each of the modules may form part of or provide data to one or more controllers the electronic control units shown in FIG. 12 and are generally known in the art so not described further.

The bus connects the various components in the control system and may comprise any suitable data bus configured to send and receive data or instructions therebetween. The bus may comprise a controller area network, CAN, bus as well known in the art.

The ECUs shown in FIG. 12 may comprise any suitable circuitry to cause performance of the methods described herein in relation to the operation of the first device. Each of the ECUs may comprise: the processor and memory as described above; control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the described methods.

The one or more embodiments are described above by way of example only and it will be appreciated that the variations are possible without departing from the scope of protection afforded by the appended claims.

The invention claimed is:

1. A method for controlling an acceleration of a vehicle, comprising:
   receiving a demand for acceleration from an operator input device;
   applying an initial transmission ratio to provide a vehicle acceleration whilst maintaining a current engine speed; and
   applying a loading transmission ratio to increase an output from the engine, wherein the loading transmission ratio is determined using the vehicle acceleration.

2. The method of claim 1, wherein the loading transmission ratio increases a load on the engine towards a full load operating point.

3. The method of claim 2, wherein the loading transmission ratio is applied until the engine is operating at the full load operating point.

4. The method of claim 2, wherein the loading transmission ratio is provided prior to increasing the current engine speed.

5. The method of claim 4, wherein the loading transmission ratio is reduced when the engine is operating at the full load operating point to increase an engine speed towards a peak power whilst maintaining the full load operating point to provide the demanded acceleration.

6. The method of claim 5, wherein the engine speed is increased until the peak power is reached.

7. The method of claim 1, wherein the loading transmission ratio is continuously adjusted as an engine load and the vehicle acceleration varies over time.

8. The method of claim 1, wherein the loading transmission ratio is determined using the acceleration demand and a vehicle speed.

9. The method of claim 1, wherein the loading transmission ratio is determined using an engine load.

10. The method of claim 1, wherein the loading transmission ratio is determined using a plurality of look-up tables.

11. The method of claim 10, wherein the loading transmission ratio is determined on the basis of the acceleration demand, a vehicle speed, the vehicle acceleration and an engine load.

12. The method of claim 11, wherein the vehicle acceleration and the engine load comprise one of a low acceleration, a medium acceleration or a high acceleration in combination with one of a low load, a medium load and a high load.

13. The method of claim 12, wherein the low acceleration comprises values of acceleration below 0.25 $ms^{-2}$, the medium acceleration comprises values between 0.25 $ms^{-2}$ and 1 $ms^{-2}$, and the high acceleration comprises values above 1 $ms^{-2}$.

14. The method of claim 12, wherein the low load comprises the engine load between 15% and 30% of a full load, the medium load comprises the engine load between 50% and 70% of the full load, and the high load comprises the engine load between 80% and 100% of the full load.

15. The method of claim 12, wherein the values of the low, the medium and the high acceleration are varied in accordance with a difference between a desired engine speed and an actual engine speed, wherein the desired engine speed is selected using a position of the operator input device and the vehicle speed.

16. The method of claim 1, wherein the initial and the loading transmission ratios are transmission ratio gradients.

17. The method of claim 1, wherein the initial transmission ratio is a rate of change of transmission ratio.

18. The method of claim 17, wherein the rate of change of transmission ratio increases between 0.01 and 0.1 per second.

19. A vehicle comprising:
   a prime mover comprising an engine;
   a transmission in which a transmission ratio is configured to be controlled via a controller, wherein the controller is configured to:
   receive a demand for acceleration from an operator input device;
   apply an initial transmission ratio to provide a vehicle acceleration whilst maintaining a current engine speed; and
   apply a loading transmission ratio to increase the output from a engine, wherein the loading transmission ratio is determined using the vehicle acceleration.

20. The vehicle of claim 19, wherein the transmission comprises a hydrostatic continuous variable transmission.

* * * * *